US005637844A

United States Patent [19]

Eiba

[11] Patent Number: 5,637,844

[45] Date of Patent: Jun. 10, 1997

[54] PROCESS AND SYSTEM FOR AUTOMATED RUNNING OF SPORTS CONTESTS

[76] Inventor: Peter Eiba, Hunnenstrasse 3, D-86343 Königsbrunn, Germany

[21] Appl. No.: 367,245

[22] PCT Filed: Jul. 9, 1993

[86] PCT No.: PCT/EP93/01001

§ 371 Date: Jan. 11, 1995

§ 102(e) Date: Jan. 11, 1995

[87] PCT Pub. No.: WO94/01839

PCT Pub. Date: Jan. 20, 1994

[30] Foreign Application Priority Data

Jul. 11, 1992 [DE] Germany .......................... 42 22 896.4

[51] Int. Cl.[6] .......................... G06F 17/00

[52] U.S. Cl. .......................... 235/375; 364/411

[58] Field of Search .......................... 235/382, 387, 235/375; 904/23; 273/371; 364/410, 411

[56] References Cited

U.S. PATENT DOCUMENTS

| | | | |
|---|---|---|---|
| 4,237,376 | 12/1980 | Giacomotti et al. | 235/487 |
| 4,268,744 | 5/1981 | McGeary | 235/375 |
| 4,319,131 | 3/1982 | McGeary | 235/375 |
| 4,367,526 | 1/1983 | McGeary et al. | 364/411 |
| 4,575,622 | 3/1986 | Pellegrini | 235/382 |
| 4,709,136 | 11/1987 | Watanabe | 235/379 |
| 5,083,271 | 1/1992 | Thacher et al. | 364/411 |
| 5,114,155 | 5/1992 | Tillery et al. | 273/371 |
| 5,359,510 | 10/1994 | Sabaliauskas | 364/410 |

FOREIGN PATENT DOCUMENTS

| | | | |
|---|---|---|---|
| 2502815 | 3/1981 | France | 235/380 |
| 28 54 229 | 7/1980 | Germany . | |
| 33 29 847 A1 | 2/1985 | Germany . | |
| 3522136 A1 | 1/1986 | Germany . | |
| 290 073 A5 | 5/1991 | Germany . | |

*Primary Examiner*—Donald T. Hajec
*Assistant Examiner*—Thien Minh Le
*Attorney, Agent, or Firm*—Knobbe, Martens, Olson & Bear, LLP

[57] ABSTRACT

A system for automated running of sports contests including a computer unit, a machine-readable data carrier for each such contestant, a data carrier containing control data for each type of contest to be performed, and at least one reader for the data carrier. Contestant data and control data are exclusively input into the computer unit using the data carriers. At least one display device linked to the computer unit displays contest data. The individual phases of the contest running may be determined by the sequence of the data carriers introduced in the reader(s).

20 Claims, 1 Drawing Sheet

PROCESS AND SYSTEM FOR AUTOMATED RUNNING OF SPORTS CONTESTS

FIELD OF THE INVENTION

The invention refers to a system and a process for automated running of sports contests.

BACKGROUND OF THE INVENTION

The running of sports contests requires one or more persons acting as contest or game managers registering the players' data before the contest is started, properly stating the provisional results and entering them into the PC unit, and compiling the respective new contest rounds by the PC unit, even if a PC unit is used which is equipped with a contest program.

DE 35 22 136 discloses a game system using video game apparatuses above city lines (regional, national, or even international). For this purpose, several magnetic card readers are used for identifying the respective contestant. The video game apparatuses are connected to a central computer via phone connections and modems to check solvency. Said central processing unit also determines the high score by comparing it to each of the remaining results of the other contestants respectively and allots the corresponding profit or loss accordingly.

First, however, the contestant has to purchase a card including some corresponding credit. This, however, requires a supervisor allocating a personal digit to each contestant and encoding the magnetic strips by means of a card encoder. Thus, the disclosed system does not function without an operator.

DE 33 29 847 deals with a system of usage for tennis courts and the like sports courts. Although an identification card is used for each respective user, extensive data inputs have to be performed via the keyboard or operating keys, which may lead to input errors.

DE 28 54 229 discloses a similar system of usage for play grounds, covered tennis courts, and the like, and cites the possibility of withdrawing the card by means of a "card sipper." This reference, however, has nothing to do with the determination of the winner/loser and the handling of a sports contest.

Furthermore, DD 290 073 discloses an indicator board for single-combat sports, wherein data input is performed by means of handies provided at each competition place. Evaluation is then made by transferring the data from the handies to the central computer, for example, by means of a floppy disk. Moreover, this reference does not give any hint as to controlling the running of a sports contest, in particular with respect to accessing the next round.

SUMMARY OF THE INVENTION

It is the object of the invention to provide a system and a process for automated running of sports contests which excludes any intentional or unintentional misoperation.

A system according to the invention comprises a computer unit, a machine-readable data carrier for each such contestant, a data carrier containing control data for each type of contest to be performed, and at least one reader for the data carrier, by means of which contestant data and control data are exclusively input into the computer unit. The system also includes at least one display device linked to the computer unit for displaying contest data, the individual phases of the contest running being determined by the sequence of the data carriers introduced in the reader(s).

In one embodiment, the computer unit and the reader(s) are accommodated within a common closed housing comprising only an insertion slot for each reader, although the display device may also be integrated in the housing. The display device may be a tele-indicating device arranged at the respective contest location. The computer unit may also be linked to a printer integrated in the housing. The system may also include a data carrier identification device for detecting the type of data carrier linked to or integrated in the computer unit. The computer unit may only permit data to be read from an introduced data carrier associated with the corresponding phase of operation, and if not, the data carrier is ejected from the reader. An excluding data carrier for erasing a contestant in the computer unit may be provided, the excluding data carrier being inserted in connection with a contestant data carrier to exclude the contestant from the contest. The housing may have a coin introduction and collection device through which the system may be activated in cooperation with the computer unit for a predetermined period of time. Indicating lights preferably located near the insertion slot(s) for the reader(s) may be provided to demand the insertion of data carriers corresponding to the respective phase of operation. The housing may also include a switch for selecting one of several desired types of contest instead of, or in addition to, the data carrier containing control data.

A process according to the invention comprises the steps of introducing a data carrier containing control data in a reader, verifying the type of data carrier by the computer unit, introducing data carriers containing contestant data in the reader(s), recording the contestant data by the computer unit, determining the teams of the first contest round by the computer unit, and indicating them on a display device, inserting the contestant data carriers of the winner and the loser in a predetermined association to the reader(s), and displaying the contest result on the display device under control of the computer unit.

In one embodiment the process may include the steps of recognizing and ejecting a data carrier introduced in a reader which does not correspond to the respective phase of operation. The process may also include selecting and starting a type of contest in a first step by introducing the control data carrier corresponding to the desired type of contest, after which the contestants' data carriers are inserted in the reader(s) one after another to enter the contestant data to the computer unit. The input of a contest result may be performed by continuously introducing the two contestant data carriers of a pair of contestants, wherein, if there are two readers, one reader is determined to have introduced the data carrier of the winner and the other one that of the loser. Or, if there is only one reader, the data carrier of the winner is inserted first and then that of the loser.

Due to the fact that the information required is entered by means of machine-readable data carriers, virtually not necessitating any data input via the keyboard, input errors will be avoided and any manipulation will be anticipated.

Furthermore, the system of the invention offers additional security by the fact that a certain operating sequence has to be observed when inserting the data carriers into the reader.

BRIEF DESCRIPTION OF THE DRAWING

Further features and advantages of the system according to the invention will become apparent from an exemplified embodiment described hereinafter, with reference to the drawing showing a schematic diagram of the embodiment.

DESCRIPTION OF THE PREFERRED EMBODIMENTS

Figure 1:
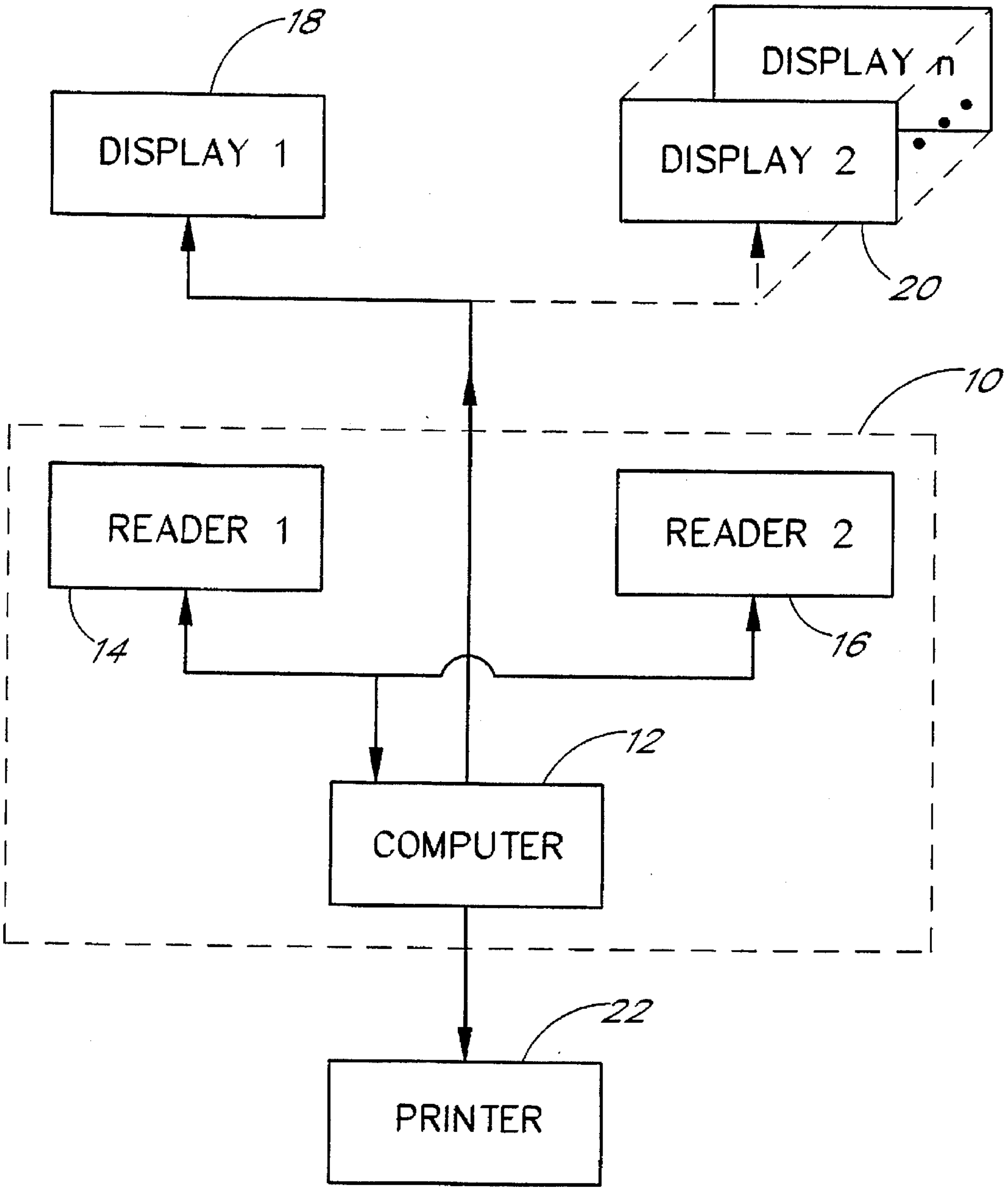

A computer 12, including a microprocessor, is used as a central unit for controlling the different processes and operations. The computer 12 is connected with one, more preferably two, reader(s) 14, 16, which serve for data input and program information stored on a machine-readable data carrier, such as a chip card, a magnetic record card, a punched card, or an optically readable card. There are different types of machine-readable data carriers coming into question as well, if they are adapted to be introduced in a corresponding reading means; compare, for example, the so-called "electronic keys."

The information received and/or processed by the computer 12 is stored in a storing means (RAM) and visually represented via a display 18. Additional displays 20 may be provided in parallel thereto.

Furthermore, a printer 22 may be connected to the computer 12.

Preferably, the computer 12 and the reader or readers 14, 16, respectively, are accommodated in a rigid housing 10 comprising only a slot for each reader to introduce the data carrier card and a switch to turn on the apparatus. It is a substantial feature of the invention that all the inputs required are made via the readers 14, 16. For this purpose there is provided one system card for each type of sports contest, which system card contains the program to be performed by the computer with respect to a specific contest. As an alternative, the programs for the different kinds of sports contests may also be stored in a ROM memory of the computer, the program for the kind of contest desired then being called up by means of a system card by reading off corresponding parameters. The types of sports contests in question may be, for example, the k.o. system, the double k.o. system, the all-rounds game, etc.

Another type of card is represented by the contestant cards containing the respective information for identifying the contestant, such as name, club, member number, qualification, date of birth, residence, etc. A guest card is given to a participant who is not a member of the club, which contestant card is provided with a random system stored as an identification.

First, the system card desired is inserted in the slot of the reader 14 or (if present) the reader 16, before starting the contest and after turning on the apparatus. Thus, the computer 12 receives the program corresponding to the sports contest desired. It should be noted that if a different card, for example, a contestant card instead of the system card, is inserted, the contestant card is immediately ejected. In principle, the apparatus checks every single time whether the right card(s) is/are inserted, or are inserted in the correct sequence, before starting the next step of the process. If this is not the case, the introduced card is ejected. Several faulty trials cause the system to return to its initial condition.

After taking over the program, the reader 14 (or 16) releases the system card, whereupon the contestant cards of all the contestants are successively inserted, and the computer 12 reads out the information contained in the cards. The computer stores the information on the contestants in a file, sorts it if need be according to desired aspects prescribed by the specific program, and initiates the representation thereof on the display(s).

Then the respective teams are selected, for example, by means of a randomizer, and depending on the type of contest desired, and are indicated on the display. It should be noted that there are programs on the market relating to such team selections. Now the games are ready to be started.

It is necessary, according to the invention, that both players insert their cards in the system such as to definitely input a score. The preferred solution, according to the invention, consists of providing two readers 14, 16 and of the winner inserting his card into the reader 14, and the loser inserting his card into the reader 16. The system only recognizes the input of the winnings and stores the corresponding score if both cards are present at the same time. As to drawn games, such a remis could be indicated to the system, for example, by re-inserting the contestant cards in a reverse configuration.

If a limited arrangement is only provided with one reader, the program may be designed such that the first card entered represents the high score, but only then if the second card, namely the loser's card, is immediately inserted after the winner's card, e.g., within a short time frame of, say, one minute after the first card.

Following each recordal of a score, the computer is able to update the respective displays.

As the computer detects all the scores of one round entered, it indicates the final result and computes the next teams, depending on the actual type of contest, and indicates them on the display.

An expulsion card is applied to cause the erasure of a contestant in the computer in case he wants to withdraw or if he is disqualified, which card is inserted together with the respective contestant card, i.e., parallel to each other into the two readers 14, 16, or one immediately succeeding the other in case there is only one reader 14.

During the input of play scores, the computer also verifies whether only contestant cards are inserted and whether the contestant cards are those of the teams in question for whom the score shall be introduced.

It should be noted that the display 18 linked to the computer may also serve to indicate the respective steps to be performed, namely inserting which card in which slot at which time. The display 18 is either accommodated in the common housing or located outside thereof at a well-visible position. After finishing a contest or a round, the scores may also be edited via the printer 22.

After the termination of a contest, the scores remain to be displayed for a certain period of time and then are cleared in the computer. Such an erasure also takes place if no input is made within a predetermined period of time.

An alternative to the representation of information on the progress may be to project them by an indicating light arranged near the respective card slot. Moreover, there is the possibility to provide for a selector switch or the like at the outer surface of the housing, which switch is stepped on from operation to operation, i.e., from insertion of the system card to the input of the contestants, etc. Furthermore, a minimum of keys may be provided to enter certain handicaps to the unit or to initiate quite specific operations. The activation of such input devices may in turn be rather restricted, for example, by the fact that one or two predetermined cards are inserted in the unit.

However, the preferred embodiment of the system of the invention reduces the possibilities of defects and manipulations. Also, the functional efficiency of the apparatus is increased by not providing for any additional elements at the housing.

Additionally, a coin slot could be provided instead of the appliance switch, such that the system will not be activated for a predetermined time than before throwing in a certain number of coins.

As has become obvious from the preceding description, the invention suggests a system for automated running of sports contests, achieving an increased degree of security on the one hand, and flexibility on the other hand, by using machine-readable data carriers as the exclusive input medium. It is no longer required to have a person conducting the contests. Incorrect inputs and manipulations which may easily be brought about via a keyboard are positively avoided, which fact is of particular importance if the apparatuses of the invention are set up in gambling halls or the like.

Although the preferred system of the invention uses card means merely comprising a reading function, it may also be taken into consideration to use reading/writing means with an alternative embodiment thereof. As to this, the fact of the completion of a contest may be recorded on the contestant card, or a qualification number stored thereon may be changed.

I claim:

1. A system for automated running of sports contests having at least one phase and in which at least two contestants participate, comprising:

a computer unit;

a machine-readable data carrier for each such contestant, each data carrier containing information for respective contestants;

a machine-readable data carrier having control data for a contest to be performed;

at least one reader for said data carrier, by means of which contestant data and control data are exclusively input into said computer unit; and at least one display device linked to said computer unit for displaying contest data, the individual phases of the contest running being determined by the sequence of the data carriers introduced in said reader.

2. The system of claim 1, wherein said computer unit and said reader are accommodated within a common closed housing, substantially only comprising an insertion slot for each reader.

3. The system of claim 2, wherein said display device is integrated in said housing.

4. The system of claim 1, wherein said display device is a tele-indicating device arranged at the respective contest location.

5. The system of claim 2, wherein, said computer unit has also linked thereto a printer integrated in the housing.

6. The system of claim 1, comprising a data carrier identification device linked to or integrated in said computer unit for detecting the type of data carrier, the computer unit only permitting data to be read from an introduced data carrier associated with a predetermined phase of operation inserted in said reader and ejecting data carriers from said reader not associated with said predetermined phase of operation.

7. The system of claim 1, comprising an excluding data carrier for erasing a contestant in said computer unit, the excluding data carrier being inserted in connection with a contestant data carrier to erase the contestant from the contest.

8. The system of claim 1, wherein after termination of a contest, said display device remains active to display the contest result for a predetermined period of time, and then said computer unit resets by erasing the data corresponding to the terminated contest.

9. The system of claim 1, comprising indicating lights located near the insertion slot for said reader to demand the insertion of data carriers corresponding to the respective phase of operation.

10. The system of claim 2, comprising a selector provided at said housing, for selecting one of several desired types of contest instead of or in addition to the data carrier containing control data.

11. The system for automated running of sports contests of claim 1, wherein said data carrier is card shaped.

12. A process for running of a sports contest, comprising the following steps:

a) introducing a data carrier containing control data in a reader;

b) verifying the type of data carrier by said computer unit;

c) introducing data carriers containing contestant data in said reader, and recording the contestant data in said computer unit;

d) determining the teams of the first contest round with said computer unit, and indicating them on a display device;

e) inserting the contestant data carriers of the contestants in said reader in a manner which indicates to the computer unit the winner and loser of the sports contest;

f) displaying the contest result on said display device under control of said computer unit.

13. The process of claim 12, further including the steps of recognizing and ejecting a data carrier introduced in a reader not corresponding to a predetermined phase of operation.

14. The process of claim 12, wherein said process comprises the additional step of printing the contest result by said printer device, said printer device being controlled by said computer unit.

15. The process of claim 12, further including the steps of selecting and starting a type of contest in a first step by introducing the control data carrier corresponding to the desired type of contest, after which the contestants' data carriers are inserted in the reader one after another to enter the contestant data to the computer unit.

16. The process of claim 12, wherein there is only one reader and said process further includes the step of inputting a contest result by introducing the two contestant data carriers of a pair of contestants, wherein the winner's contestant data carrier is inserted first and that of the loser is inserted second.

17. The process of claim 12, wherein there are two of said readers and said process further includes the step of inputting a contest result by introducing the two contestant data carriers of a pair of contestants, wherein the winner's contestant data carrier is inserted into one reader and the loser's contestant data carrier is inserted into the other reader.

18. The process of claim 12, further including the steps of maintaining said display device active for a predetermined period of time after termination of a contest to display the contest result, and subsequently resetting said computer unit by erasing the data corresponding to the terminated contest.

19. A system for automated running of sports contests having at least one phase and in which at least two contestants participate, comprising:

a computer unit having a memory storing control data for a contest to be performed;

a machine-readable data carrier for each such contestant, each data carrier containing information for respective contestants;

at least one reader for said data carrier, by means of which contestant data are exclusively input into said computer unit; and at least one display device linked to said computer unit for displaying contest data, the individual phases of the contest running being determined by the sequence of the data carriers introduced in said reader.

20. The system of claim 19, including a machine-readable data carrier adapted to be read by said reader and having parameters for signalling said computer unit which type of contest is to be run.

* * * * *

UNITED STATES PATENT AND TRADEMARK OFFICE

CERTIFICATE OF CORRECTION

PATENT NO. : 5,637,844

DATED : June 10, 1997

INVENTOR(S) : Peter Eiba

It is certified that error appears in the above-indentified patent and that said Letters Patent is hereby corrected as shown below:

On the cover page, please correct the PCT No. from "[86] PCT No.: PCT/EP93/01001" to --[86] PCT No.: PCT/EP93/01801--.

Signed and Sealed this

Twenty-first Day of October 1997

Attest:

BRUCE LEHMAN

*Attesting Officer* *Commissioner of Patents and Trademarks*